United States Patent [19]

Funahashi et al.

[11] Patent Number: 4,820,565

[45] Date of Patent: Apr. 11, 1989

[54] MAGNETIC RECORDING MEDIUM

[75] Inventors: Masaya Funahashi, Osaka; Teruhisa Miyata, Otokuni; Kenichi Inoue, Muko; Akira Miyake, Otokuni, all of Japan

[73] Assignee: Hitachi Maxell, Ltd., Osaka, Japan

[21] Appl. No.: 132,686

[22] Filed: Dec. 14, 1987

Related U.S. Application Data

[63] Continuation of Ser. No. 833,199, Feb. 27, 1986, abandoned.

[30] Foreign Application Priority Data

Feb. 27, 1985 [JP] Japan .................................. 60-38358

[51] Int. Cl.$^4$ .............................................. G11B 5/70
[52] U.S. Cl. ...................................... 428/64; 428/694; 428/695; 428/900
[58] Field of Search ................... 428/64, 65, 694, 695, 428/900

[56] References Cited

U.S. PATENT DOCUMENTS

| | | | |
|---|---|---|---|
| 4,172,176 | 10/1979 | Tanaka | 428/900 |
| 4,383,000 | 5/1983 | Fujiki | 428/695 |
| 4,383,001 | 5/1983 | Fujiki | 428/695 |
| 4,405,481 | 9/1983 | Yamada | 428/900 |
| 4,522,885 | 6/1985 | Funahashi | 428/695 |
| 4,601,946 | 7/1986 | Iida | 428/900 |

Primary Examiner—Paul J. Thibodeau
Attorney, Agent, or Firm—Birch, Stewart, Kolasch & Birch

[57] ABSTRACT

A magnetic recording medium improved in durability over a wide range of temperature which comprises a substrate and a magnetic layer comprising magnetic powder and a resinous binder formed on the substrate, characterized in that the magnetic layer further comprises a monovalent alcohol ester of a fatty acid and a straight chain saturated fatty acid ester of not less than 28 carbon atoms in a weight proportion of 99:1 to 1:99 in a combined amount of 0.1 to 20 percent by weight based on the weight of the magnetic powder.

3 Claims, No Drawings

MAGNETIC RECORDING MEDIUM

This application is a continuation of application Ser. No. 833,199, filed on Feb. 27, 1986, now abandoned.

This invention relates to a magnetic recording medium improved in durability over a wide range of temperatures.

In magnetic recording media such as magnetic disks, magnetic tapes and magnetic sheets prepared by applying a magnetic coating composition comprising magnetic powder, a resinous binder and an organic solvent onto a substrate such as a polyester film to make a magnetic layer, the magnetic layer is apt to be worn away due to its contact with a magnetic head as well as with a pad under a high velocity at a recording and reproducing. Thus, development of a magnetic recording medium having excellent wear-resistance and durability properties has been highly desired.

For this purpose, it has already been proposed to incorporate a variety of lubricants into the magnetic layer. A typical example of such lubricants is a monovalent alcohol ester of a fatty acid. In fact, the incorporation of this ester can surely improve the wear-resistance to a certain extent at low temperatures but does not improve the wear resistance at high temperatures.

SUMMARY OF THE INVENTION

As a result of extensive study for overcoming these drawbacks, it has now been found that the combined use of a monovalent alcohol ester of a fatty acid with a straight chain saturated fatty acid ester of not less than 28 carbon atoms can improve the wear-resistance even at an elevated temperature. Thus, the incorporation of the monovalent alcohol fatty acid and the straight chain saturated fatty acid ester into a magnetic layer can provide a magnetic recording medium excellent in durability not only at a low temperature but also at a high tempeature such as 40° C. This invention is based on the above finding.

Accordingly, a main object of the present invention is to provide a magnetic recording medium of high durability over a wide range of temperatures which comprises a substrate and a magnetic layer comprising magnetic powder and a resinous binder formed thereon, characterized in that the magnetic layer further comprises a monovalent alcohol ester with a fatty acid and a straight chain saturated fatty acid ester of not less than 28 carbon atoms as lubricants.

As stated above, it is characteristic in the present invention that a monovalent alcohol fatty acid ester and a straight chain fatty acid ester of not less than 28 carbon atoms are used in combination as the lubricants for the magnetic layer of a magnetic recording medium.

The monovalent alcohol fatty acid ester to be used in this invention is usually of low viscosity and the viscosity is not to a large extent, temperature dependent. Such monovalent alcohol fatty acid ester usually has a melting point of not higher than 10° C., preferably of not higher than 0° C. The monovalent alcohol portion may be saturated or unsaturated and usually has not more than 20 carbon atoms. Preferred are those originating from saturated alcohols of 1 to 8 carbon atoms or originating from oleyl alcohol. The fatty acid portion may be saturated or unsaturated and is normally of not more than 20 carbon atoms. Preferred are those originating from saturated fatty acids of 4 to 14 carbon atoms or originating from oleic acid. Specific examples of the monovalent alcohol fatty acid ester are butyl myristate, butyl laurate, octyl laurate, butyl oleate, octyl oleate, oleyl oleate, methyl oleate, etc.

As the straight chain saturated fatty acid ester, there may be used the one having a melting point of not lower than 20° C., preferably of not lower than 40° C. The ester should have not less than 28 carbon atoms in the total number. Preferably, the acid portion may be derived from a saturated fatty acid of 16 to 30 carbon atoms, while the alcohol moiety may be derived from a saturated alcohol moiety of 12 to 30 carbon atoms. Specific examples are lauryl palmitate, myristyl palmitate, palmityl palmitate, stearyl palmitate, lauryl stearate, myristyl stearate, palmityl stearate, stearyl stearate, etc.

The combined amount of the monovalent alcohol fatty acid ester and the straight chain saturated fatty acid ester to be inorporated into the magnetic layer is usually from 0.1 to 20 % by weight based on the weight of the magnetic powder. When the amount is less than 0.1% by weight, the wear resistance over a wide range of temperature is not sufficienty improved. When more than 20 % by weight, bleeding-out occurs at the surface of the magnetic layer so that the spacing between the magnetic head and the surface of the magnetic layer is increased and the output is lowered. The weight proportion of the monovalent alcohol fatty acid ester and the straight chain saturated fatty acid ester may be usually from 99 : 1 to 1 : 99, preferably from 95 : 5 to 20 : 80. When the proportion of the monovalent alcohol fatty acid ester is too small, the improvement of the wear-resistance at a low temperature is insufficient. When the proportion of the straight chain saturated fatty acid ester is too small, the wear-resistance at a high temperature is not sufficiently improved.

Still, various types of the monovalent alcohol fatty acid ester and the straight chain saturated fatty acid ester may be respectively employed alone or in combination.

For formation of a magnetic layer comprising the monovalent alcohol fatty acid ester and the straight chain saturated fatty acid ester as the lubricants, there may be adopted any conventional procedure. For instance, said lubricant materials are dissolved in an appropriate solvent or solvent mixture (e.g. n-hexane, methanol, ethanol, isopropanol, freon) to make a lubricant solution, and this lubricant solution may be coated or sprayed onto a magnetic layer comprising magnetic powder as previously prepared. Alternatively, the magnetic layer may be dipped in said lubricant solution. Further, magnetic powder and a resinous binder may be incorporated into said lubricant solution to make a magnetic coating composition, which is applied onto a substrate to form a magnetic layer. When desired, the thus formed magnetic layer may be subjected to supercalendering or polishing at the surface.

As the magnetic powder, there may be used metallic iron, metallic cobalt, iron or cobalt alloy, gamma-Fe2O3, Fe3O4, intermediary oxide of iron or cobalt or its cobalt-modified product, barium ferrite or the like. Examples of the resinous binder are vinyl chloride resin, vinyl acetate resin, vinyl chloride/vinyl acetate copolymer, vinyl chloride/vinyl acetate/vinyl alcohol copolymer, polyurethane resin, cellulose resin, polyester resin or its sulfonated product, vinylidene chloride/acrylonitrile copolymer, acrylonitrile/butadiene copolymer, isoprene rubber, butadiene rubber, etc. In addition, the magnetic coating composition or the magnetic layer may comprise any other additive such as a hardner (e.g. low molecular weight isocyanate compound).

Practical and presently preferred embodiments of the invention are illustratively shown in the following Examples wherein part(s) are by weight unless otherwise indicated.

EXAMPLE 1

For preparation of a magnetic coating composition, the following materials were used:

| Composition | Part(s) |
|---|---|
| Co-containing gamma-$Fe_2O_3$ magnetic powder | 100 |
| alpha-$Fe_2O_3$ powder | 10 |
| "HS-500" (carbon black; manufactured by Asahi Carbon K.K.) | 15 |
| "RSI" (nitrocellulose; manufactured by Daicell Ltd.) | 16 |
| "HI2000" (polyurethane resin; Dainippon Ink and Chemicals, Ltd.) | 16 |
| "Coronate L" (trifunctional low molecular weight polyisocyanate compound; manufactured by Nippon Polyurethane Co., Ltd.) | 8 |
| Octyl oleate | 10 |
| Stearyl stearate | 1 |
| Cyclohexanone | 205 |
| Toluene | 205 |

The above materials were well mixed in a ball mill to prepare a magnetic coating composition. The coating composition was applied to both surface of a polyester base film of 75 $\mu$ in thickness to form a magnetic layer having a thickness of about 1.1 $\mu$ (after drying) on each surface and dried, followed by punching into a round disk form to obtain a magnetic recording disc.

EXAMPLE 2

Preparation of a magnetic recording disc was carried out in the same manner as in Example 1 but using oleyl oleate (10 parts) instead of octyl oleate.

Comparative Example 1

Preparation of a magnetic recording disc was carried out in the same manner as in Example 1 but omitting stearyl stearate.

Comparative Example 2

Preparation of a magnetic recording disc was carried out in the same manner as in Example 1 but omitting octyl oleate.

Comparative Example 3

Preparation of a magnetic recording disc was carried out in the same manner as in Example 1 but using butyl stearate (10 parts) instead of octyl oleate and omitting stearyl stearate.

Every five samples of the magnetic recording discs obtained in each of Examples 1 to 2 and Comparative Examples 1 to 3 were each placed into a jacket for dust prevention and then set in a recording-reproducing apparatus for testing the durability. Each magnetic recording disc was subjected to recording at 5 or 40° C. while contacting with the magnetic head under the following conditions: head pressure, 60 g; running speed, 300 rpm; circumferential speed, 4 m/sec; write frequency, 125 KHz. The running (rotation) times until the reproducing output decreased to 70 % of the initial output were counted.

The results are shown in Table 1.

TABLE 1

| | Running times ($\times 10^{-4}$) | |
|---|---|---|
| | 5° C. | 40° C. |
| Example | | |
| 1 | 1100 | 1100 |
| 2 | 1100 | 1100 |
| Comparative | | |
| 1 | 1000 | 700 |
| 2 | 300 | 300 |
| 3 | 800 | 400 |

As can be seen in Table 1, the magnetic recording discs of the invention (Examples 1 to 2) are greater in running times than conventional magnetic recording discs (Comparative Examples 1 to 3), particularly at 40° C. Accordingly, it may be said that the magnetic recording discs of the invention are excellent in wear-resistance and durability over a wide range of temperature.

What is claimed is:

1. A magnetic recording disc improved in wear-resistance and durability, which comprises a substrate and a magnetic layer comprising magnetic powder and a resinous binder formed on at least one surface of the substrate, characterized in that the magnetic layer further comprises
   (A) a monovalent alcohol ester of oleic acid, and
   (B) a straight chain saturated fatty acid ester of not less than 28 carbon atoms derived from a saturated fatty acid of 16 to 30 carbon atoms and a saturated alcohol of 12 to 30 carbon atoms, wherein the combined amount of (A) and (B) is from 0.1 to 20% by weight based on the weight of the magnetic powder and the weight proportion of (A) and (B) is from about 99:1 to 1:99.

2. The magnetic recording disc according to claim 1, wherein the monovalent alcohol ester of oleic acid (A) is a member selected from the group consisting of oleyl oleate and octyl oleate.

3. The magnetic recording disc according to claim 1, wherein the straight chain saturated fatty acid ester of not less than 28 carbon atoms (B) is a member selected from the group consisting of lauryl palmitate, myristyl palmitate, palmityl palmitate, stearyl palmitate, lauryl stearate, myristyl stearate, palmityl stearate and stearyl stearate.

* * * * *